(12) United States Patent
Gering et al.

(10) Patent No.: US 8,191,618 B2
(45) Date of Patent: Jun. 5, 2012

(54) METHODS OF FORMING THERMAL MANAGEMENT SYSTEMS AND THERMAL MANAGEMENT METHODS

(75) Inventors: Kevin L. Gering, Idaho Falls, ID (US); Daryl R. Haefner, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1171 days.

(21) Appl. No.: 11/537,785

(22) Filed: Oct. 2, 2006

(65) Prior Publication Data

US 2011/0232890 A9    Sep. 29, 2011

Related U.S. Application Data

(62) Division of application No. 10/772,762, filed on Feb. 4, 2004, now Pat. No. 7,147,071.

(51) Int. Cl.
*B60H 3/00* (2006.01)
*B60H 1/00* (2006.01)
*B60H 1/32* (2006.01)

(52) U.S. Cl. ............ 165/202; 165/10; 165/41; 165/236; 429/62; 429/120; 180/65.21; 237/2 A; 237/12.3 B; 123/41.31; 123/142.5 R

(58) Field of Classification Search .................... 165/41, 165/202, 10, 236; 429/120, 62; 180/65.21; 237/12.3 B, 2 A; 123/41.31, 142.5 R
See application file for complete search history.

(56) References Cited

U.S. PATENT DOCUMENTS

| | | | |
|---|---|---|---|
| 2,282,923 A | 5/1942 | Ambruster | |
| 2,405,144 A | 8/1946 | Holthouse | |
| 2,666,091 A * | 1/1954 | Martin et al. | 429/120 |
| 2,917,287 A * | 12/1959 | Tryon | 165/236 |
| 3,236,206 A * | 2/1966 | Willinger | 206/205 |
| 3,425,485 A * | 2/1969 | Newton | 165/50 |
| 3,905,884 A | 9/1975 | Parenti et al. | |
| 4,007,315 A * | 2/1977 | Brinkmann et al. | 429/62 |
| 4,057,101 A | 11/1977 | Ruka et al. | |
| 4,248,291 A * | 2/1981 | Jarmul | 165/10 |
| 4,415,847 A | 11/1983 | Galloway | |
| 4,582,765 A | 4/1986 | Kothmann | |
| 4,691,766 A | 9/1987 | Wurz et al. | |
| 5,239,839 A | 8/1993 | James | |
| 5,449,571 A | 9/1995 | Longardner et al. | |
| 5,678,760 A | 10/1997 | Muso et al. | |
| 5,687,706 A | 11/1997 | Goswami et al. | |
| 5,735,133 A | 4/1998 | Voss et al. | |
| 5,834,132 A | 11/1998 | Hasegawa et al. | |

(Continued)

FOREIGN PATENT DOCUMENTS

EP    44998 A1 *    2/1982

(Continued)

*Primary Examiner* — John Ford
(74) *Attorney, Agent, or Firm* — TraskBritt

(57) ABSTRACT

A thermal management system for a vehicle includes a heat exchanger having a thermal energy storage material provided therein, a first coolant loop thermally coupled to an electrochemical storage device located within the first coolant loop and to the heat exchanger, and a second coolant loop thermally coupled to the heat exchanger. The first and second coolant loops are configured to carry distinct thermal energy transfer media. The thermal management system also includes an interface configured to facilitate transfer of heat generated by an internal combustion engine to the heat exchanger via the second coolant loop in order to selectively deliver the heat to the electrochemical storage device. Thermal management methods are also provided.

11 Claims, 6 Drawing Sheets

U.S. PATENT DOCUMENTS

| | | | |
|---|---|---|---|
| 5,871,041 A | 2/1999 | Rafalovich et al. | |
| 5,952,815 A | 9/1999 | Rouillard et al. | |
| 6,059,016 A * | 5/2000 | Rafalovich et al. | 165/41 |
| 6,087,036 A | 7/2000 | Rouillard et al. | |
| 6,239,502 B1 | 5/2001 | Grewe et al. | |
| 6,276,166 B1 | 8/2001 | Sarkisian et al. | |
| 6,357,541 B1 | 3/2002 | Matsuda et al. | |
| 6,464,027 B1 | 10/2002 | Dage et al. | |
| 6,512,347 B1 | 1/2003 | Hellmann et al. | |
| 6,705,101 B2 | 3/2004 | Brotz et al. | |
| 6,793,012 B2 | 9/2004 | Fang et al. | |
| 6,932,153 B2 | 8/2005 | Ko et al. | |
| 6,963,131 B2 | 11/2005 | Frisch et al. | |
| 7,007,501 B2 | 3/2006 | Hu | |
| 7,147,071 B2 * | 12/2006 | Gering et al. | 180/65.21 |

FOREIGN PATENT DOCUMENTS

| | | | |
|---|---|---|---|
| JP | 57136092 A | * | 8/1982 |

* cited by examiner

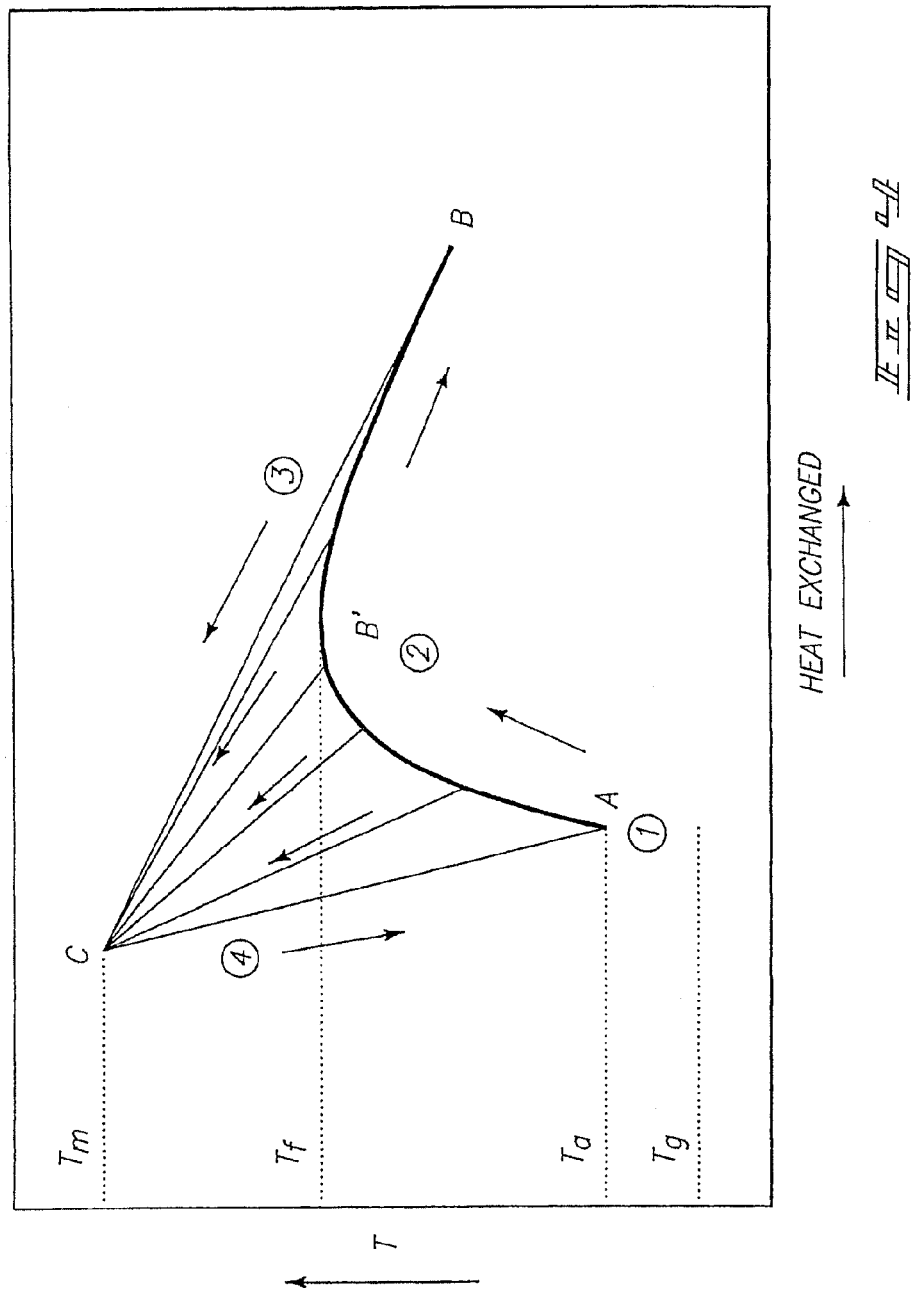

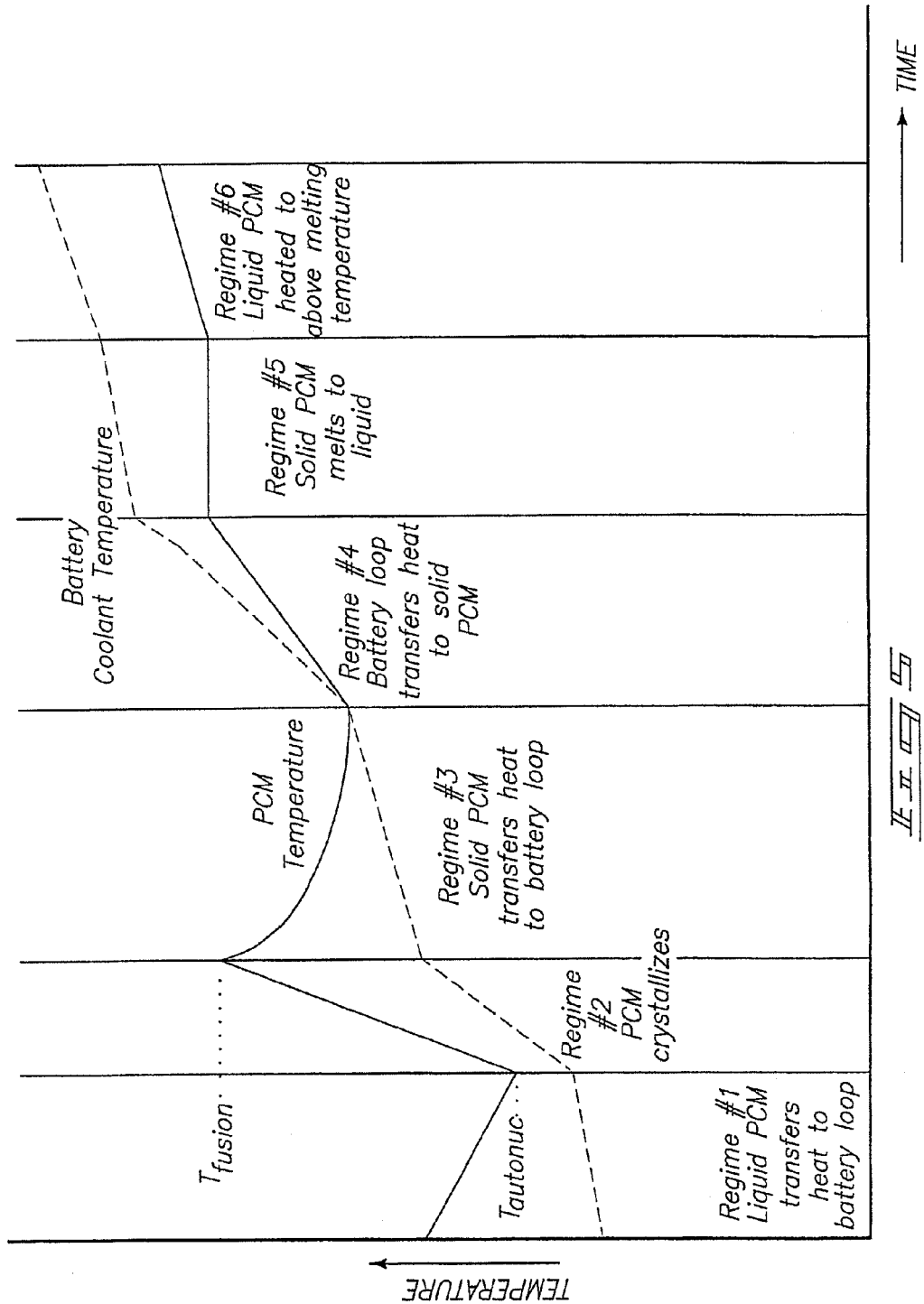

METHODS OF FORMING THERMAL MANAGEMENT SYSTEMS AND THERMAL MANAGEMENT METHODS

CROSS-REFERENCE TO RELATED APPLICATIONS

This application is a divisional of U.S. application Ser. No. 10/772,762, entitled THERMAL MANAGEMENT SYSTEMS AND METHODS, filed on Feb. 4, 2004, now U.S. Pat. No. 7,147,071, issued Dec. 12, 2006.

GOVERNMENT RIGHTS

This invention was made with government support under Contract No. DE-AC07-991D13727 and Contract No. DE-AC07-051D14517 awarded by the United States Department of Energy. The government has certain rights in this invention.

TECHNICAL FIELD

Aspects of the invention generally relate to thermal management systems (TMSs) and methods.

BACKGROUND OF THE INVENTION

Hybrid electric vehicles (HEVs) and electric vehicles (EVs) provide improved fuel economy and reduced air emissions over conventional vehicles. The performance of HEVs and EVs depends on energy storage systems such as batteries. Battery performance influences, for example, acceleration, fuel economy, and charge acceptance during recovery from regenerative braking. As the cost of the batteries, durability, and life-cycle affect the cost and reliability of a vehicle using the batteries for vehicular operation, parameters that affect the efficiency of the batteries may have to be optimized to achieve optimized vehicular performance.

It is known that temperature has an influence over battery performance. Battery modules carrying batteries are preferred to operate within an optimum temperature range that is suitable for a particular electrochemical pair. For example, the desired operating temperature for a lead-acid battery is 25° C. to 45° C. Battery modules may also have to be operated at uniform temperatures as uneven temperature distribution may result in varied charge-discharge behavior. Such varied charge-discharge behavior may lead to electrically unbalanced modules and reduced battery performance.

HEVs may be less reliable in northern latitudes due to cold temperature constraints imposed on the batteries carried by the HEVs. Lithium-ion batteries have been a candidate for use in HEVs, and such batteries have optimum performance when operating from 0° C. to 40° C. Below 0° C., power output of the batteries diminishes and the effect of temperature becomes more severe as the level of discharge increases. Conversely, as temperatures exceed above 40° C., detrimental cathode corrosion and other irreversible reactions may occur, resulting in shortened battery life.

Accordingly, a battery thermal management system (TMS) is needed to achieve desired and reliable performance in varied climatic conditions while minimizing temperature excursions outside a desired temperature range.

SUMMARY OF THE INVENTION

Aspects of the invention also relate to a comprehensive thermal management system for hybrid electric vehicles that include both an internal combustion engine and battery-based locomotion (example, lithium-ion, or nickel-metal hydride). Aspects of the invention also disclose a thermal management system configured to provide a mechanism to pre-warm a vehicle's battery module, having a plurality of individual cells, in cold conditions, provide auxiliary warmth to the module as needed, and remove heat from it as the batteries heat up due to normal ohmic discharge and recharge.

In some embodiments, a thermal management system for a vehicle includes a heat exchanger having a thermal energy storage material provided therein. The thermal management system includes a first coolant loop thermally coupled to an electrochemical storage device located within the first coolant loop and to the heat exchanger, a second coolant loop, thermally coupled to the heat exchanger, the first and second coolant loops configured to carry distinct thermal energy transfer media. The thermal management system also includes an interface configured to facilitate transfer of heat generated by an internal combustion engine to the heat exchanger via the second coolant loop in order to selectively deliver the heat to the electrochemical storage device. Thermal management methods are also provided.

In other embodiments, a thermal management system for a hybrid electric vehicle includes a heat exchanger having a phase change material provided therein, a first fluid loop having a first coolant mixture flowing therein, and a second fluid loop having a second coolant mixture flowing therein, the second coolant mixture being distinct from the first coolant mixture. The first and second fluid loops are configured to be in thermal communication with the heat exchanger, the heat exchanger being configured to flow only the first coolant mixture within the heat exchanger. The thermal management system also includes a thermal interface configured to transfer heat produced by an internal combustion engine of the vehicle to the heat exchanger, the heat exchanger being configured to store the heat generated by the internal combustion engine and selectively provide the stored heat to control thermal characteristics of various components of the vehicle including a battery module.

In yet other embodiments, a thermal management method for a vehicle includes providing a heat exchanger having a thermal energy storage material disposed therein, providing first and second coolant loops to circulate distinct coolant mixtures through the respective first and second coolant loops, thermally coupling the first coolant loop to a battery module located within the first coolant loop, thermally coupling the second coolant loop to the heat exchanger, and providing an interface in close proximity to the second coolant loop. The interface is configured to transfer heat generated by an internal combustion engine of the vehicle to the heat exchanger, via the second coolant loop, for storage within the thermal energy storage material. The method also includes selectively performing one or more of preheating the battery module, heating a passenger cabin of the vehicle, increasing sensible heat or latent heat of fusion of the material from a first thermal state to a higher second thermal state using the heat stored within the thermal energy storage material.

BRIEF DESCRIPTION OF THE DRAWINGS

Preferred embodiments of the invention are described below with reference to the following accompanying drawings.

FIG. 4 is a graph illustrating a thermal cycle for a phase change material that is stored in a heat exchanger in accordance with various embodiments of the invention.

FIG. 5 is a graph illustrating temperature history of a phase change material and battery cooling fluid in accordance with various embodiments of the invention.

DETAILED DESCRIPTION OF THE PREFERRED EMBODIMENTS

Figure 1:
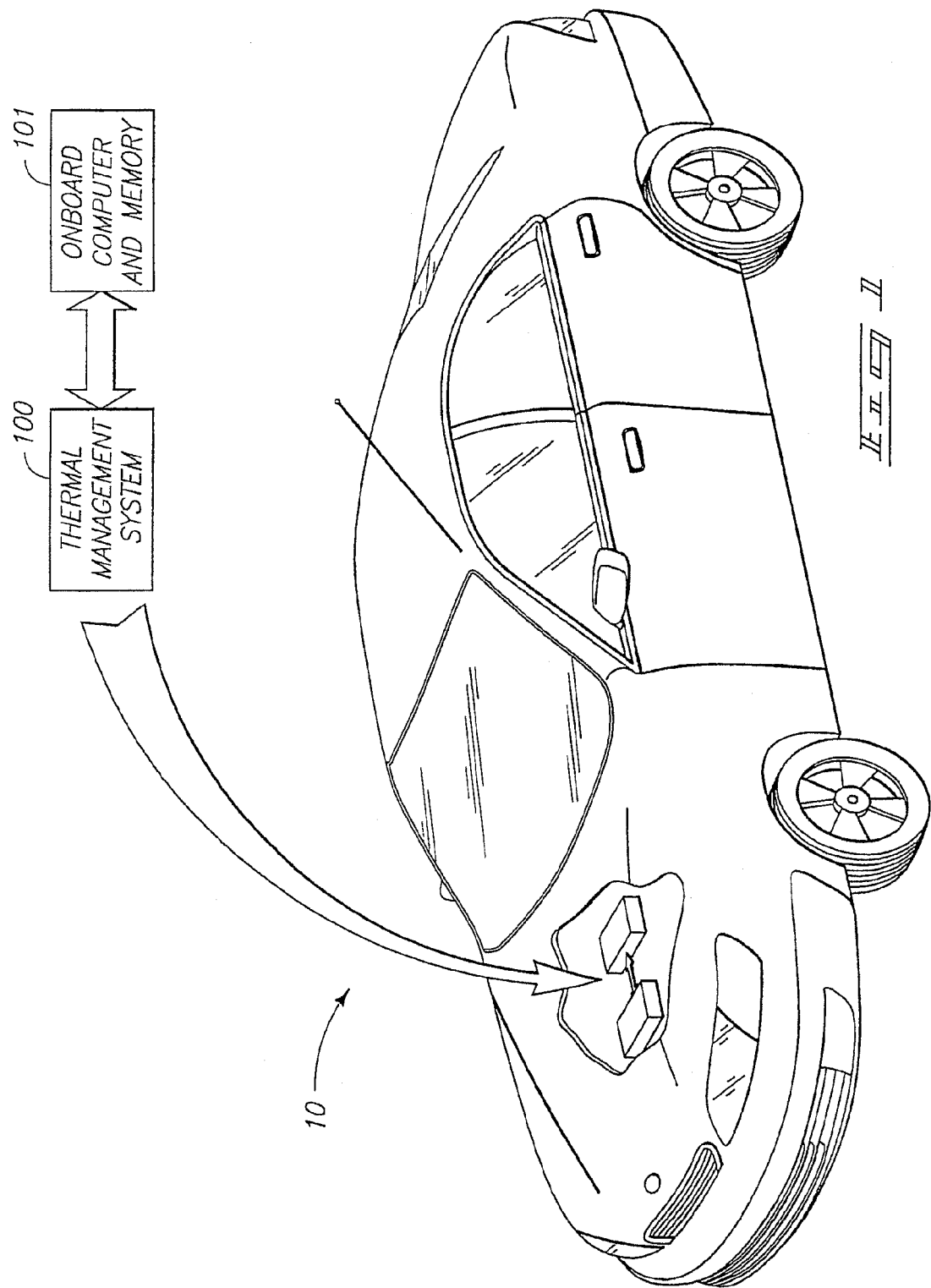
FIG. 1 shows a schematic of a vehicle in accordance with various embodiments of the invention.

This disclosure of the invention is submitted in furtherance of the constitutional purposes of the U.S. Patent Laws "to promote the progress of science and useful arts" (Article 1, Section 8).

The following terminology as described below is used to define terms that are used in this application.

The following operational parameters and control strategy may be used in various embodiments:

Measured Temperatures $T_{Batt}$: average or representative temperature within battery module of battery 110.

$T_{Cab}$: representative temperature of coolant within the internal combustion engine cabin (ICE cabin) heater core 118.

$T_{PCM}$: average or representative temperature within phase change material (PCM) module 214, 218 of heat exchanger (HX) 116.

$T_{Rad}$: representative temperature of the internal combustion engine radiator coolant/fluid in loop 104.

Set-point Temperatures $T_{min}$: minimum desirable battery temperature.

$T_{max}$: maximum desirable battery temperature.

T*: minimum desirable temperature of cabin heater core.

T**: phase change material melting temperature plus a margin of 5° C. to 10° C.

Control strategy in accordance with various embodiments of the invention

V1—full open to heat exchanger 106: $T_{Batt}>T_{max}$; otherwise closed to heat exchanger 106.

V2—full open to Bypass: $T_{Batt}>T_{max}$; otherwise closed to Bypass.

V3—full open to cabin core: $[(T_{Batt}>T_{min})$ and $(T_{Batt}<T_{max})]$ and $(T_{Cab}<T^*)$ and $(T_{Rad}<T^*)$ and $(T_{PCM}>T_{Cab})$; otherwise open to internal combustion engine radiator 120.

FAN 108—On at $T_{Batt}>T_{max}$; otherwise Off.

P1-On: $(T_{Batt}<T_{min})$ or $(T_{Batt}>T_{max})$.

Off: $(T_{Batt}>T_{min})$ and $(T_{Batt}<T_{max})$.

P2-On:
  (a) using internal combustion engine coolant/fluid in loop 104 to help warm batteries 110.
  $(T_{Batt}<T_{min})$ and $(T_{PCM}<T_{min})$ and $(T_{Rad}>T_{PCM})$.
  (b) sending excess heat to cabin heater core 118
  $[(T_{Batt}>T_{min})$ and $(T_{Batt}<T_{max})]$ and $(T_{PCM}>T_{Cab})$ and $(T_{Cab}<T^*)$ and $(T_{Rad}<T^*)$.
  (c) remelting phase change material (214, 218) and increasing sensible heat of the phase change material (214, 218).
  $\{[(T_{Batt}>T_{min})$ and $(T_{Batt}<T_{max})]$ or $(T_{Batt}>T_{max})\}$ and $(T_{PCM}<T^{})$ and $(T_{Rad}>T^{})$.
  Otherwise Off.

FIG. 1 shows a vehicle 10 embodying the invention. The vehicle 10 includes a thermal management system 100 and an on-board processor (and memory) or processor 101 in communication with the thermal management system 100.

The thermal management system 100 is configured to manage heat (e.g., thermal management of electrochemical energy storage device 110 (e.g., battery module or battery (FIG. 2))) of vehicle 10 during various phases of vehicular operation, such as, for example, cold-start conditions, normal conditions, and hot environmental conditions. The device 110 is generally referred to herein as battery 110. The device 110 may also be provided as an electrochemical energy storage device module. Further details of the thermal management system 100 are set forth and described below with reference to FIG. 2. Exemplary embodiments of battery types include lithium-ion, nickel-metal hydride, and lead-acid. The electrochemical energy storage device may comprise one or more batteries, capacitors, fuel cells, or combinations thereof.

The on-board processor 101 is configured to control various operations of the vehicle 10 including controlling of various sensors (not shown) of the vehicle 10. The on-board processor 101 may also be configured to control heat (e.g., heat supplied/discharged to/from the battery 110 (FIG. 2)) together with the thermal management system 100, during various phases of vehicular operation as noted above. In some embodiments, the processor 101 may comprise circuitry configured to execute provided programming. For example, the processor 101 may be implemented as a microprocessor or other structure configured to execute executable instructions of programming including, for example, software or firmware instructions. Other exemplary embodiments of the processor 101 include hardware logic, PGA, FPGA, ASIC, or other structures. These examples of the processor 101 are illustrative. As such, other configurations are possible for implementing operations performed by the processor 101.

In some embodiments, a separate processor is used in connection with the thermal management system 100 than the on-board processor.

In other embodiments, the processor 101 may be programmed with predetermined temperature value(s) in a desired temperature range (e.g., of battery 110 (FIG. 2)) corresponding to various phases of vehicular operation as noted above. The processor 101 is configured to compare the stored value(s) with measured temperature value(s) and provide instructions, based on the comparison, to the thermal management system 100 configured to manage heat of the battery 110 during various phases of operation of the vehicle 10. Further details of such heat management are set forth below with reference to FIG. 2.

Figure 2:
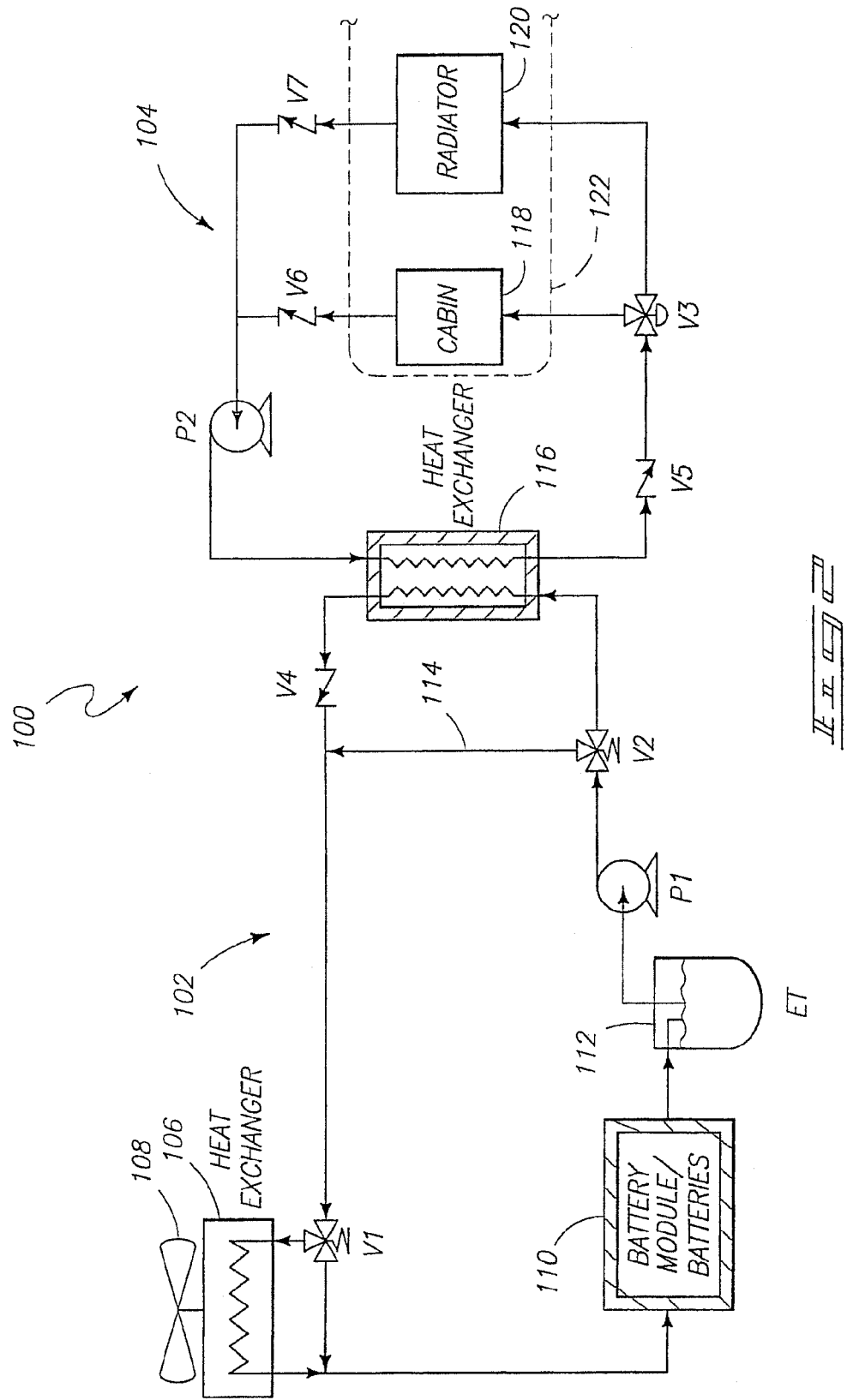
FIG. 2 is a schematic of a thermal management system as shown in FIG. 1 in accordance with various embodiments of the invention.

FIG. 2 is a schematic of the thermal management system 100 as shown in FIG. 1. The thermal management system 100 includes heat exchanging fluid loops 102, 104, heat exchangers 106, 116, a fan 108 corresponding to the heat exchanger 106, a battery 110 (e.g., a lithium-ion battery or a battery bank), a coolant expansion tank (ET) 112, pumps P1 and P2, a bypass loop 114, an internal combustion engine cabin heater core 118 (referred to herein as internal combustion engine cabin), an internal combustion engine radiator 120, and an interface 122. The thermal management system 100 also includes a plurality of valves V1-V7 (e.g., control valves V1-V3 and check valves V4-V7).

The loop 102 (shown to the left-hand side of heat exchanger 116) is configured as battery-side coolant loop for flowing or recirculating coolant or a fluid, or a thermal energy transfer medium from the expansion tank 112 to add or remove heat from the battery 110 of the vehicle 10 (FIG. 1). The loop 102 is alternatively referred to herein as "battery fluid loop." In some embodiments, coolant flowing in the loop 102 is circulated via the loop 114 bypassing the heat exchanger 116. In other embodiments, coolant flowing in the loop 102 flows through the heat exchanger 116 without flowing via the loop 114. The control valve V2 is appropriately controlled (e.g., opened or closed) to achieve such functionality.

The loop 104 (shown to the right-hand side of heat exchanger 116) is configured as an internal combustion engine side coolant loop 104 for flowing or recirculating heat exchanging fluid or a coolant via the heat exchanger 116, or the internal combustion engine cabin 118 in some embodiments. In other embodiments, the loop 104 is configured for flowing or recirculating the heat exchanging fluid via the heat exchanger 116 and the internal combustion engine radiator 120 bypassing the internal combustion engine cabin 118. The heat exchanging fluid flowing through the loop 104 may be a coolant used for cooling the internal combustion engine (not shown), whereas the fluid flowing through the loop 102 can be of a different composition, compared to the fluid in the loop 104, to achieve unique heat transfer performance for the loop 102.

The heat exchanger 106, together with the fan 108, is configured to control temperature of the battery 110 to be within a predetermined optimal range. In one embodiment, fluid in the loop 102 is recirculated through the heat exchanger 106 in order to control excessive temperatures of the fluid in the loop 102, the fluid being circulated through the battery 110.

Battery 110 includes energy storage batteries configured to provide energy for operation of the vehicle 10 (FIG. 1). The battery 110 may be configured to have the loop 102 passing through the battery 110 to control thermal characteristics of the battery 110. It will be appreciated that the battery 110 may be configured to include a module to house a fluid (e.g., coolant) and such module may be configured to be coupled to the loop 102.

The expansion tank 112 may be configured as a coolant expansion tank for housing the fluid that is circulated in the loop 102.

The loop 114 is configured as a bypass loop for the fluid recirculating in the loop 102. Fluid in the loop 102 may be flowed through the loop 114 bypassing the heat exchanger 116 in some embodiments.

Figure 3:
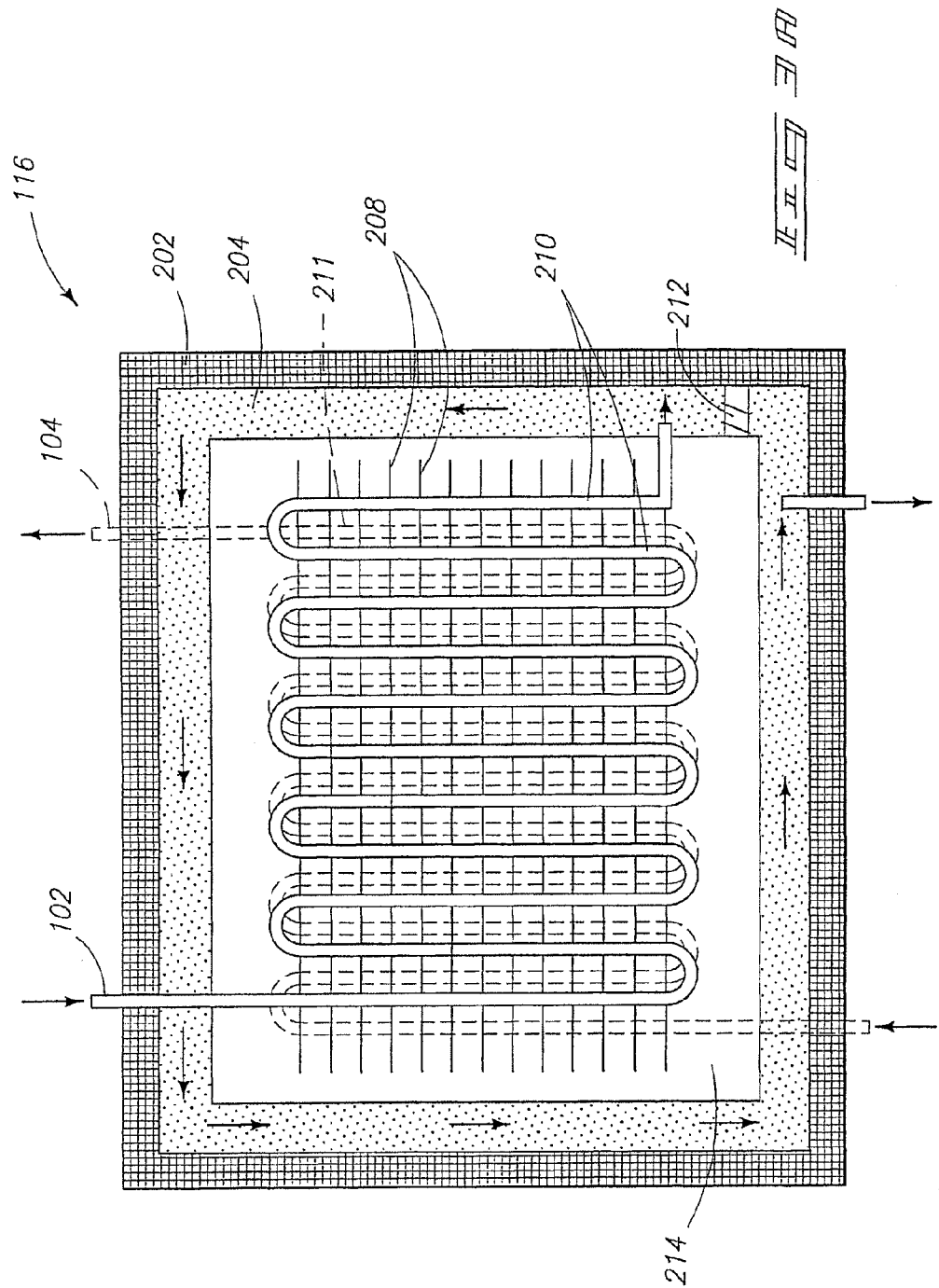
FIG. 3A is a schematic of a heat exchanger shown in FIG. 2 in accordance with some embodiments of the invention.
FIG. 3B is a schematic of a heat exchanger shown in FIG. 2 in accordance with other embodiments of the invention.
Figure 12:
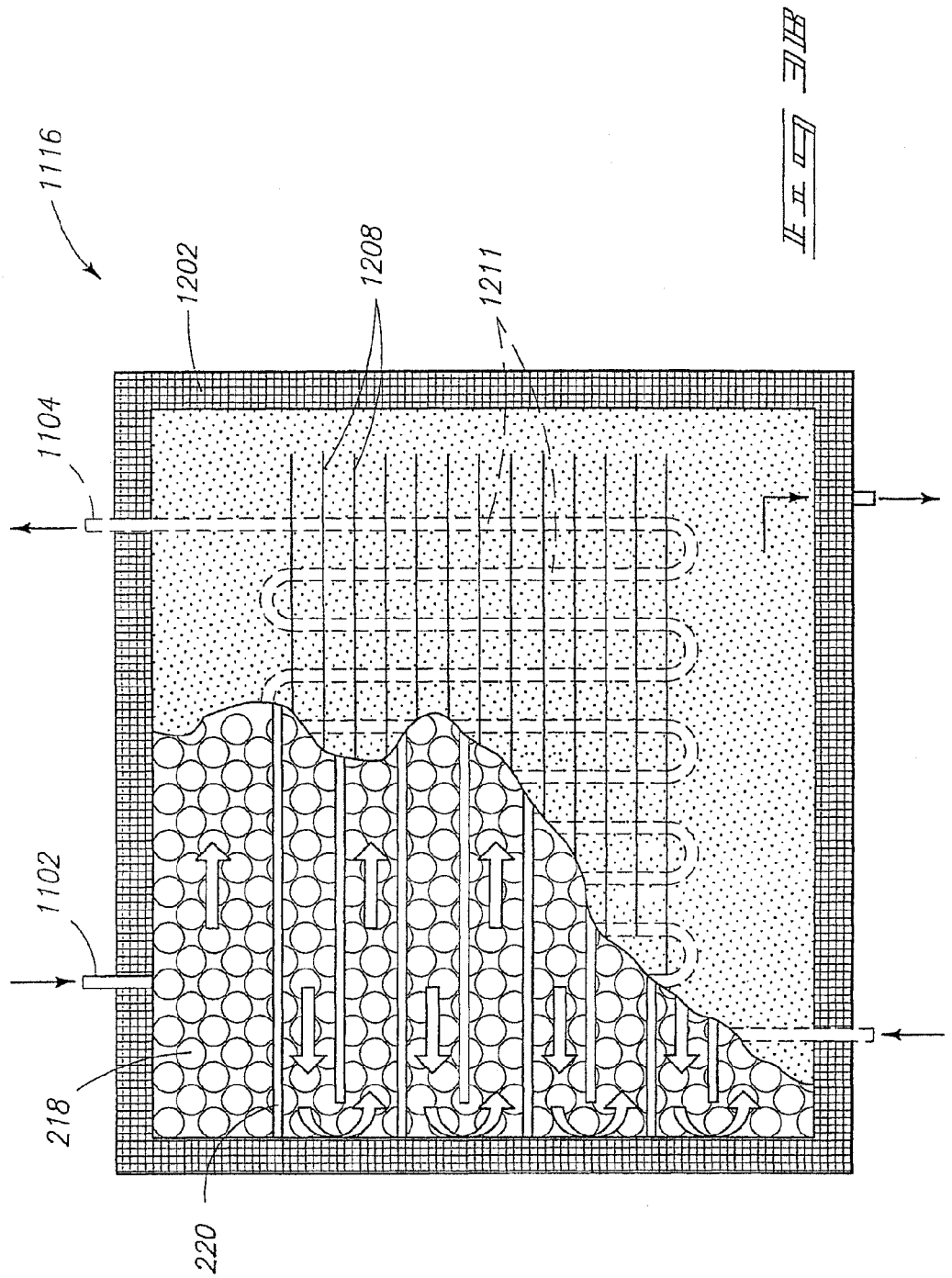

The heat exchanger 116 is configured as a well-insulated heat exchanger vessel to store a fixed volume of phase change material (e.g., a phase change material in a pouch 214 or spheres 218, as shown in FIGS. 3A and 3B) and a small volume of fluid (e.g., coolant) that is pre-warmed from a prior operation of the vehicle 10. The phase change material of the heat exchanger 116 provides latent and sensible heat that may be transferred to the fluid flowing through the heat exchanger 116 in some embodiments.

The heat exchanger 116 is further configured to facilitate heat transfer to control thermal characteristics of the battery 110 as well as controlling a temperature of a passenger cabin of the vehicle 10 by flowing the fluid in the loop 104 via the internal combustion engine cabin 118 in some embodiments. Further design details of the heat exchanger 116 are set forth below with reference to FIGS. 3A and 3B.

The heater core of the internal combustion engine cabin 118 is configured to provide heat to the passenger cabin of the vehicle 10 to maintain a temperature of the passenger cabin within a predetermined temperature range.

The internal combustion engine radiator 120 is configured to control the temperature of the internal combustion engine.

The interface 122 is configured as an interface between the thermal management system 100 and the internal combustion engine (not shown) of the vehicle 10. For example, the interface 122 is designed to transport heat transfer fluids containing waste heat generated by the internal combustion engine to control the temperature of the battery 110 provided in the loop 102. Waste heat generated by the internal combustion engine may be transferred to the heat exchanger 116 via the loop 104, and the heat transferred to the heat exchanger 116 is stored in the phase change material resident in the heat exchanger 116. Such heat stored in the phase change material resident in the heat exchanger 116 is then provided to the battery 110 via the loop 102 to increase the temperature $T_{Batt}$ of the battery 110.

Phase change materials are desirable in a thermal management system due to exothermic heat of phase change, or latent heat, that is released as the phase change material undergoes a transition from one state (e.g., liquid) to another state (e.g., solid). Phase change materials are also desirable as a thermal cycle of most phase change materials is reversible, thus enabling the phase change material to be regenerated from a solid state to a liquid state by the addition of external heat. With regeneration, a phase change material may be used as a reliable heat source for multiple times. The combination of the phase change material, latent heat and sensible heat (e.g., heat above that which is required to achieve phase change material melting) increases the overall heating value per mass.

The phase change materials used in various embodiments of the invention are desired to have the following characteristics:
 (i) Undergo fusion/melting within the desired temperature range (e.g., melting below 90° C. and fusion (crystallization) at no lower than −20° C.);
 (ii) limited or controlled super cooling so that nucleation would occur on demand;
 (iii) high heat of fusion;
 (iv) rapid crystallization so that heat is generated at a useable rate;
 (v) ability to undergo numerous cycles without degradation or diminished performance;
 (vi) be inexpensive, readily available, non-toxic, non-flammable, non-reactive, and non-corrosive.

The inventors have determined the materials as listed in Table I to be viable phase change material candidates for various embodiments of the invention.

TABLE I

| Phase Change Material | Melting Temperature, ° C. | Auto-nucleation Temperature, ° C. |
| --- | --- | --- |
| Sodium acetate 3.6-hydrate | 58 | −10 to −18 |
| Sodium acetate 4.0-hydrate | 58 | −14 to −18 |
| Sodium acetate/magnesium acetate (1 wt % Mg) 3.5-hydrate | 58 | −17 to −21 |
| Sodium acetate/magnesium acetate (5 wt % Mg) 3.5-hydrate | 58 | −14 to −20 |
| Ethylene carbonate | 36 | 8.2 |
| Ethylene carbonate/propylene carbonate (3.7 mole % PC) | 36 | −0.5 |
| Ethylene carbonate/propylene carbonate (5.6 mole % PC) | 36 | 3.4 |
| Ethylene carbonate/propylene carbonate (6.7 mole % PC) | 36 | 12.8 |
| Calcium chloride 6.0-hydrate | 30 | 2 |
| Sodium hydrogen phosphate 12-hydrate | 35 | 20 to 25 (ambient) |

In accordance with various embodiments, the thermal management system 100 is configured to maintain temperatures of the battery 110 within an optimal range while providing heat for cabin comforts under cold environmental conditions. For example, an optimal range may be chosen to be between 0° C. to 40° C. Such a temperature range was found to be favorable for lithium-ion batteries.

During the operation of the thermal management system 100, fluids within the loops 102, 104 are circulated to add or remove heat according to a predetermined thermal protocol (e.g., predetermined values or established conditions) of the vehicle 10. Valves V1-V3 (e.g., control valves) and valves V4-V7 (e.g., one-way check valves) are configured to ensure that respective fluids in the loops 102, 104 flow through desired fluid paths. Valves V1 and V2 are specified as thermostatic, wherein their actuation is driven by the temperature of the fluid flowing through each valve. Valve V3 is electronically actuated based on control logic resident within the processor 101 and relevant temperature inputs described herein. The operation of the thermal management system 100 may be described by the following exemplary modes of operation: (1) cold-start conditions, (2) normal conditions, and (3) hot mode. Each mode of operation is controlled by defined control parameters as described below.

Under cold-start conditions, the temperature ($T_{Batt}$) of the battery 110 may not be within a predetermined temperature range. In some embodiments, if $T_{Batt}$ is beneath the predetermined temperature range, then the pump P1 is operated (e.g., turned ON) and valve V2 is controlled to circulate the fluid (e.g., coolant) from the battery 110 to the heat exchanger 116, whereupon sensible heat (e.g., heat stored in the fluid present in the heat exchanger 116) is transferred to the fluid circulating in the loop 102 and flowing through the heat exchanger 116. For example, after pump P1 is operated, fluid from the battery 110 and flowing in the loop 102 flows to the heat exchanger 116 and displaces the pre-warmed fluid therein. The pre-warmed fluid is circulated to the battery 110 by appropriately operating the valves V4 and V1. In other embodiments, latent heat from the phase change material resident in the heat exchanger 116 can also be transferred if the fluid circulating in the loop 102 and in contact with the phase change material (reference numerals 214, 218 of FIGS. 3A and 3B) in the heat exchanger 116 is sufficiently cold to initiate auto-nucleation of the phase change material 214, 218.

However, if the heat exchanger 116 is unable to provide sufficient heat (e.g., to the fluid circulating in the loop 102 through the heat exchanger 116) to increase $T_{Batt}$ due to the low temperature $T_{PCM}$ of the phase change material (214, 218), then pump P2 is operated (e.g., turned ON) to circulate fluid (e.g., internal combustion engine coolant) from the internal combustion engine (not shown) to the heat exchanger 116 via the interface 122 (e.g., internal combustion engine-heat exchanger interface). In this case, waste heat generated by the internal combustion engine is transferred to the heat exchanger 116. For example, if the fluid in the internal combustion engine is warmer than $T_{PCM}$ and $\{(T_{Batt}<T_{min})$ and $(T_{PCM}<T_{min})\}$, then the pump P2 is turned ON to circulate warm fluid from the internal combustion engine to the heat exchanger 116 via the interface 122. After the pump P2 is turned ON, the pump P1 is operated to circulate fluid, present in the loop 102, through the heat exchanger 116 until the temperature of the battery 110 is restored to be within the predetermined temperature range.

Operation of thermal management system 100 under normal conditions is now described. Normal conditions described herein are defined by the temperature $T_{Batt}$ of the battery 110 being within the predetermined temperature range. Under the normal conditions, the pump P1 remains OFF. However, the pump P2 may recirculate fluid in the loop 104 to the heat exchanger 116 in order to remove excess heat from the heat exchanger 116 if the temperature ($T_{PCM}$) of the phase change material (214, 218) resident in the heat exchanger 116 is greater than the temperature of the fluid circulating in the loop 104. After the excess heat from the phase change material (214, 218) is transferred to the fluid in the loop 104, valves V5 and V3 are appropriately controlled to route the fluid from the heat exchanger 116, with the received excess heat, to the internal combustion engine cabin 118 if the temperature of the internal combustion engine cabin 118 is less than a predetermined temperature range.

However, if the temperature of the internal combustion engine cabin 118 is within a predetermined temperature range, then valve V3 is controlled to route the fluid from the heat exchanger 116, with the received excess heat, to the internal combustion engine radiator 120 and bypassing the internal combustion engine cabin 118. Circulating the fluid that is received from the heat exchanger 116 to flow through the internal combustion engine radiator 120 further increases the temperature of the fluid that is circulated in the loop 104. The fluid flowing from the internal combustion engine radiator and circulating in the loop 104 is flowed through the heat exchanger 116, by controlling the valve V7 and the pump P2, to remelt the phase change material (214, 218) resident in the heat exchanger 116, thereby increasing the thermal energy of the phase change material. This process ensures that the phase change material (214, 218) is remelted at the first opportunity, thereby reactivating the phase change material and keeping it ready for subsequent use under cold-start conditions as explained above.

It will be appreciated that normal conditions may occur under cold ambient conditions, since the battery 110 and the heat exchanger 116 are sufficiently insulated to render the thermal management system 100 operable within predetermined optimal temperature ranges. The types and methods of insulation used may depend on maximum acceptable heat loss rates for the battery 110 and the heat exchanger 116. Such heat loss rates may depend on vehicle-dependent factors, as well as regional weather characteristics. In some embodiments, the battery 110 and the heat exchanger 116 are designed such that $T_{Batt}$ is above 0° C. and $T_{PCM}$ is above 40° C. over a period of 36 hours of inactivity of the vehicle 10.

Operation of the thermal management system 100 under hot conditions is now described. Hot conditions occur when temperature ($T_{Batt}$) of the battery 110 exceeds the optimal temperature range due to normal ohmic discharge and recharging of the battery 110. Under hot conditions, fluid in the loop 102 is made to bypass the heat exchanger 116 by controlling the valve V2 (e.g., closing valve V2 to heat exchanger 116 and opening valve V2 to bypass loop 114). The valve V1 controls the fluid in the loop 102 to flow through the heat exchanger 106 (e.g., air cooled heat exchanger). After receiving the fluid in the heat exchanger 106, the fan 108 is turned ON until $T_{Batt}$ drops below the maximum optimal temperature (e.g., 40° C.). Under the hot conditions, and in some embodiments, the pump P2 may be turned ON while the valve V3 is configured to direct the fluid in the loop 104 to circulate between the internal combustion engine radiator 120 and the heat exchanger 116 to heat the phase change material (214, 218) resident in the heat exchanger 116 as described above.

FIG. 3A is a cross-sectional schematic of the heat exchanger 116 shown in FIG. 2, in accordance with some embodiments. The heat exchanger 116 includes the fluid circulation loops 102, 104, insulation 202, a fluid (e.g., coolant) filled chamber 204, a plurality of heat exchange fins 208, heat exchange tubing 210, 211, a baffle member 212, and a phase change material filled pouch 214.

The fluid circulation loops 102, 104 are configured to circulate fluid to control, for example, the thermal characteristics of the battery 110, temperature of the internal combustion engine cabin 118, and the heat content of the phase change material (214, 218) resident in the heat exchanger 116. Such have been described above with reference to FIG. 2 and therefore will not be repeated.

The chamber 204 is configured to circulate fluids received from the loops 102, 104, respectively, in order to control the temperature of the circulating fluids to be within predetermined temperature ranges. The fluid circulating in the loop 102 flows within the heat exchanger 116 and the chamber 204, while fluid circulating in the loop 104 flows through the tubing 211 without flowing through the chamber 204.

The heat exchange fins 208 and the heat exchange tubing 210, 211 may be provided within the pouch 214 (e.g., heavy-gauge polymer pouch) filled with phase change material. In one embodiment, the pouch 214 is configured to expand and contract as the phase change material disposed therein undergoes changes in density during phase transitions. In one embodiment, heat exchange tubing 210, 211 may share the heat exchange fins 208. As noted above, fluid circulating in the loop 104 and flowing via the tubing 211 remains within the tubing 211 during its passage through the heat exchanger 116. However, fluid circulating in the loop 102 and flowing via the tubing 210 passes from the tubing 210 into the chamber or void space 204 provided between the phase change material pouch 214 and an internal wall bounded by the insulation 202 of the heat exchanger 116.

The baffle member 212 blocks the pathway of the fluid circulating in the loop 102, the tubing 210, and the chamber 204 such that the fluid is forced to travel around the pouch 214 before it is allowed to leave the heat exchanger 116, thereby facilitating increased heat absorption by the phase change material resident in the heat exchanger 116.

The embodiment shown in FIG. 3A may be desired where heat transfer rate to and from the phase change material provided in the pouch 214 is desired to be maintained at a predetermined level. Further, the embodiment shown in FIG. 3A may be used where an auxiliary device or a nucleation-triggering device (not shown) is desired to be placed in close proximity with the phase change material filled pouch 214 to promote forced nucleation.

In another embodiment, a "nucleation-triggering device" may be provided within the phase change material (PCM) reservoir in order to activate the phase change material (e.g., 214, 218) on demand. This mode of activation may be provided as an alternative to auto-nucleation, and may be performed per the control logic (e.g., processor 101) resident in the vehicle 10 (FIG. 1). Enabling the phase change material to be activated on demand provides more consistent and timely nucleation of the phase change material. For example, the auxiliary device or nucleation-triggering device may be employed within the tubular encapsulated phase change material within heat exchanger 1116 (FIG. 3B). An exemplary embodiment of such triggering device is a fixed stainless steel disc (e.g., fixed within a short, rigid tubular enclosure) having a slight concavity, that has several parallel thin slits cut into its interior. Upon flexure of the disc through a mechanical trigger, the interfacial dynamics between the disc and liquid phase change material induce phase change material crystallization. The inventors have demonstrated and found to be effective a device comprised solely of the stainless steel disc (having exemplary dimensions of 5/8 inch diameter by 0.02 inch thickness) to be effective for nucleating PCM materials such as sodium acetate trihydrate, ethylene carbonate, and calcium chloride hexahydrate. Stainless steel nucleators having other designs are possible.

FIG. 3B is a cross-sectional schematic of a heat exchanger 1116 in accordance with some embodiments wherein elements like those shown in FIG. 3A are identified using similar reference numerals, but with a prefix "1" added.

In a preferred embodiment of the invention, the phase change material of the heat exchanger 1116 may be encapsulated in section(s) of flexible tubing instead of being encapsulated in spheres 218. The flexible tubing may be configured to conform to the internal space of the heat exchanger 1116 (e.g., coils, serpentine, or straight sections, etc.). The inventors have discovered that, by using the flexible tubing instead of the spheres, a lower volume of encapsulant material is used for a similar volume of the phase change material. The ratio of encapsulant volume to the volume of the phase change material may be further reduced by using the flexible tubing with a thinner wall thickness. Exemplary selection criteria for the encapsulant tubing include high thermal conductivity, chemical compatibility, thermal compatibility, expandable/contractible properties of the tubing with phase change material phase changes, and increased lifetime. If wide variations of phase change material density are anticipated, then ends of the tubing may be heat-sealed or capped to allow a small volume of air to be trapped within the tubing.

The heat exchanger 1116 includes fluid circulation loops 1102 and 1104, insulation 1202, a plurality of heat exchange fins 1208, a heat exchange tubing 1211, and a baffled section 220 having phase change material encapsulated in spheres 218. The encapsulating material may be polypropylene in one case. In one embodiment, the baffled section 220 with the phase change material spheres 218 is configured to surround the heat exchange tubing 1211. Fluid in the circulation loop 1102 flows in the baffled pathway indicated by the arrows. The fluid in the loop 1102 is provided in intimate contact with the phase change material spheres 218. However, the fluid in the loop 1102 does not flow to disperse within the baffled section 220.

The embodiment shown in FIG. 3B may be desirable where the phase change material resident in the heat exchanger 1116 has an auto-nucleation point within a predetermined temperature range (e.g., 0° C. to 40° C.). The heat exchanger 1116 shown in FIG. 3B may be easier to service, and is configured to use different phase change materials as the phase change material is encapsulated in spheres.

The embodiments of the heat exchanger 116, 1116 shown in FIGS. 3A and 3B are exemplary. Other arrangements (e.g., a plate-and-frame design with external fins) of the heat exchanger are possible. An oval or cylindrical profile of the overall heat exchanger may be preferred for some other vehicle applications. Performance of the heat exchanger (e.g., heat exchanger 116) may be optimized by using an intelligent selection of phase change materials, such as for example, organic carbonates or hydrated inorganic salts as shown in Table I above. The choice of a phase change material may be based on the vehicle type and the geographic region of the vehicle's intended use.

FIG. 4 is a graph illustrating a thermal cycle for a phase change material stored in a heat exchanger (e.g., heat exchanger 116) in accordance with various embodiments of the invention. The thermal cycle path A-B-C shown in the graph indicates a normal thermal cycle, while the path A-B'-C indicates a shortened thermal cycle resulting in an incomplete release of heat from the phase change material resident in the heat exchanger 116. The general steps for the phase change material utilization cycle in accordance with the various embodiments are shown in Table II below:

TABLE II

| Step | Temperature Change | Description/Requirements |
|---|---|---|
| 1. Activation at low ambient temperature ($T_a$) | At $T_a$ | May occur at any temperature lower than the melting point ($T_m$) but above the glass transition temperature ($T_g$) of a metastable phase change material, provided the phase change material is in the liquid state. It is preferred to activate the phase change material via intelligent control, e.g., do not want spontaneous uncontrolled activation. |
| 2. Chain reaction fusion (exothermic) | $T_a$ to $T_f$ | Energy Release: exothermic transition from liquid to solid proceeds along a thermal path that is system-dependent, accounting for the unique rate of heat release from the phase change material. The maximum fusion temperature ($T_f$) is lower than the melting point, as shown, and may vary according to the initial state of the phase change material system, such as, for example, phase change material mass, phase change material conductivity, configuration, rate of heat transfer to the surroundings, etc. |
| 3. Regeneration | $T_f$ to $T_m$ | Energy Uptake: heat absorption into phase change material occurs as the material changes from a solid (ordered) to a liquid (random). Heat source would be waste heat (e.g., from internal combustion engine coolant provided in loop 104 or battery-side coolant provided in loop 102) at or above $T_m$. Phase change material could be heated above the melt temperature to increase its sensible heat. If stored in a well-insulated vessel, the molten phase change material may retain a high heating value. |
| 4. Phase change material is cooled by contact with cold coolant under cold-start conditions | $T_m$ to $T_a$, but over $T_g$ | Phase change material is allowed to cool and reaches its auto-nucleation temperature, whereupon it undergoes transition from liquid state to solid state. In some embodiments, the PCM may undergo forced nucleation while being at a temperature above its auto-nucleation point, yet below its melting point. |

FIG. 5 is a graph illustrating temperature history of a phase change material and the fluid (e.g., battery cooling fluid) circulating in the loop 102 in accordance with various embodiments of the invention. In the description of FIG. 5, references to PCM refer to the phase change material (e.g., 214, 218) resident in the heat exchanger 116 as set forth in various embodiments.

Initially, the phase change material may be in a liquid state and at a higher temperature than the fluid circulating in the loop 102. Such a state is identified as "Regime 1" on the temperature-history graph of FIG. 5. The phase change material would continue to transfer heat, with a loss in temperature, until crystallization occurs at a temperature $T_{autonuc}$. After nucleation begins, crystallization spreads throughout the phase change material and is accompanied by a rise in temperature. The ultimate temperature reached by the phase change material during the second regime (e.g., Regime 2) is its melting temperature. Throughout Regime 2, heat is transferred to the fluid in the loop 102. After the phase change material crystallization is complete, the phase change material present in a solid state is still warm relative to the fluid circulating in the loop 102 and continues to deliver heat to such fluid. Such a state is identified by Regime 3. Regime 3 continues until the temperature of the phase change material and the temperature of the fluid circulating in the loop 102 are equal.

During the course of normal vehicle use, battery 110 experiences ohmic-type heating as it is discharged and recharged. Excess heat from the battery 110 that is warmed may be transferred back to the phase change material, as shown in Regime 4. As noted above, the phase change material is selected to undergo phase transition over a desired range of temperature. In Regime 4, transfer of heat from the loop 102 to the phase change material continues so long as the temperature of the battery 110 is higher than the temperature of the phase change material. Continued heat transfer to the phase change material would result in melting of the phase change material until the phase change material is in a completely liquid state (Regime 5). Additional heating of the phase change material that is in the liquid state may be possible and is identified by Regime 6. The additional heat may be provided from warm batteries (e.g., battery 110), or from an internal combustion engine, as in the case of hybrid electric vehicles. At the conclusion of Regime 6, the phase change material is fully charged and ready for another cycle of operation.

The following equations estimate temperatures of the fluid in the heat exchanger (e.g., heat exchanger 116) in accordance with various embodiments, as a function of time throughout a complete discharge and recharge cycle of the phase change material.

For the battery coolant fluid (e.g., fluid in the loop 102):

$$Q_{BL} = m_{BL} \times C_{P,EG} \times (T_{BL,out} - T_{BL,in}) \quad (1)$$

For the combustion engine coolant fluid (e.g., fluid in the loop 104):

$$Q_{CE} = h_{CE} \times A_{CE} \times (T_{CE,ave} - T_{BL,ave}) = m_{CE} \times C_{P,EG} \times (T_{CE,in} \times T_{CE,out}) \quad (2)$$

For the phase change material (e.g., phase change material 214, 218) housed in a cylindrical container (e.g., in heat exchanger 116, heat exchanger 1116), heat loss from a cylinder:

$$Q_{PCM} = 2\pi L k_{PCM} \times (T_c - T_{w,in}) \quad (3)$$
$$= 2\pi L k_W \times (T_{W,in} - T_{W,out}) / \ln(r_{out}/r_{in})$$
$$= h_{BL} \times A_{BL} \times (T_{W,out} - T_{BL,ave})$$

The above-noted rate equations are coupled with an energy equation written for the sensible heat change or heat of fusion change for the phase change material over a small time step, $\Delta t$:

For sensible heat change:

$$Q_{PCM} = M_{PCM} \times C_{P,PCM} \times (T_{f,PCM} - T_{i,PCM})/\Delta t \quad (4a)$$

For heat change associated with crystallization/melting:

$$Q_{PCM} = [M_{PCM} \times \Delta H - M_{PCM} \times C_{P,PCM} \times (T_{melt} - T_c)]/\Delta t \quad (4b)$$

where $A_{BL}$ = heat transfer area at the battery fluid (e.g., fluid in the loop 102) and phase change material container (e.g., heat exchanger 116, heat exchanger 1116) interface $A_{CE}$=heat transfer area of combustion engine exchanger
$C_{P,EG}$=heat capacity of fluid (e.g., in the loop 102) coolant (ethylene glycol)
$C_{P,PCM}$=heat capacity of the phase change material
$\Delta H$=heat of fusion for the phase change material
$\Delta t$=time step
$h_{BL}$=convective heat transfer coefficient for the battery coolant fluid at the exterior wall of the phase change material container
$h_{CE}$=convective heat transfer coefficient for the combustion engine coolant fluid (e.g., fluid in the loop 104)
$k_{PCM}$=thermal conductivity of the phase change material
$k_W$=thermal conductivity of the wall material holding the phase change material
L=length of cylinder housing the phase change material
$M_{PCM}$=mass of phase change material
$m_{BL}$=mass flow rate of battery coolant fluid
$m_{CE}$=mass flow rate of combustion engine coolant
$Q_{BL}$=heat transfer rate for the battery coolant
$Q_{CE}$=heat transfer rate for the combustion engine coolant
$Q_{PCM}$=heat transfer rate for the phase change material
$r_{in}$, $r_{out}$=inner, outer radius of cylinder holding the phase change material
$T_{BL}$=temperature of the battery coolant fluid
$T_c$=centerline temperature of phase change material
$T_{CE}$=temperature of combustion engine coolant fluid
$T_{f,PCM}$=phase change material temperature at the end of time step
$T_{i,PCM}$=phase change material temperature at the start of time step
$T_{melt}$=melting temperature of phase change material
$T_W$=wall temperature of container holding phase change material Depending on the regime being modeled, the above-described equations may be solved iteratively for small time steps to provide a temperature profile as a function of time.

In a control volume approach, thermal analysis of the battery or battery module 110 involves applying the conservation of energy equation (e.g., first-law analysis) to a control volume having encapsulated battery (e.g., battery 110) identified as "V" in the below equations:

The general equation may be provided as follows:

$$\frac{\delta Q}{dt} - \frac{\delta W_s}{dt} = \iint_{cs}\left(e + \frac{p}{\rho}\right)\rho(\bar{v}\cdot\bar{n})dA + \frac{\partial}{\partial t}\iiint_{cv} e\rho dV + \frac{\delta W_M}{dt} + \frac{\delta Q_{source}}{dt}$$
↑ ↑ ↑ where quantities marked by an arrow would have zero or near-zero values in some cases.

Thus, for the thermal management system 100 according to various aspects:

$$\frac{\delta Q}{dt} = \frac{\partial}{\partial t}\iiint_{cv} e\rho dV + \frac{\delta Q_{source}}{dt} \tag{1}$$

For discrete $\Delta t$, $$\frac{\delta Q_{source}}{dt} \cong \dot{q}_{source}V \text{ for } \dot{q}_{source}(=)\frac{\text{Energy}}{\text{Vol}\cdot\text{time}}$$

$$\therefore \left[\frac{\delta Q}{dt} = \frac{\partial}{\partial t}\iiint_{cv} e\rho dV + \dot{q}_{source}V\right]$$

In some cases, $\dot{q}_{source}V$ is not shown as a separate term. Following that convention:

$$\left[\frac{\delta Q}{dt} = \frac{\partial}{\partial t}\iiint_{cv} e\rho dV\right] \tag{2}$$

The left-hand side (LHS) of Equation (2) shows:

$$\frac{\delta Q}{dt}:$$

The rate of heat addition (or subtraction) to the control volume is due to both convection from the heat transfer medium and the internal heat source. Thus, we define $$\left[\frac{\delta Q}{dt} = hA(T_\infty - T) + \dot{q}_{source}V\right] \tag{3}$$

where h is the heat transfer film coefficient or convection coefficient; A=heat transfer surface area (encapsulated cylinder wall plus one end).

The right-hand side (RHS) of Equation (2) shows:

$$\frac{\partial}{\partial t}\iiint_{cv} e\rho dV:$$

The rate of energy increase within the control volume, assuming constant properties, can be expressed as $$\left[\frac{\partial}{\partial t}\iiint_{cv} e\rho dV = \rho V c_p \frac{dT}{dt}\right], \tag{4}$$

a thermodynamic-based relation.

Setting RHSs of Eqs. (3) and (4):

$$\left[\rho V c_p \frac{dT}{dt} = hA(T_\infty - T) + \dot{q}_{source}V\right] \tag{5}$$

or $$\frac{dT}{dt} = \frac{1}{\rho V c_p}[hA(T_\infty - T) + \dot{q}_{source}V]$$

The above provides three independent equations and three unknowns under the method based on the lumped-parameter model (LPM).

$$\left[\frac{\Delta T}{\Delta t} \cong \left(\frac{1}{\rho V c_p}\right)_{Batt} \left[hA(T_\infty - T) + \begin{array}{c} \dot{q}_{source}(T) \\ \uparrow i.e. \\ \dot{q}_{source}V \end{array}\right]\right] \quad (6)$$

where $\Delta T \equiv T - T_o$

T is unknown $\rho, V, c_p$ for battery

Alternately, the exact analytical solution of Eq (6) in differential form is $$\left(\frac{hA(T_\infty - T) + \dot{q}(T)V}{hA(T_\infty - T_o) + \dot{q}(T_o)V}\right) = e^{-\left(\frac{hAt}{\rho V c_p}\right)_{Batt}}$$

Here, T and $T_\infty$ are unknown.

$$\frac{\Delta Q_{cell}}{\Delta t} = hA(T_\infty - T) + \dot{q}_{source}V \quad (7)$$

or, more properly $$\left[\frac{\Delta Q_{cell}}{\Delta t} \cong hA(T_\infty - T) + \dot{q}_{source}(T)V\right]$$

Unknowns are $(\Delta Q, T_\infty, T)$.
Regarding heat received by $$\underset{\text{resident}}{(M)} \text{ and } \underset{\text{Labile}}{\dot{m}}$$

coolant in/through battery module (e.g., battery 110), given here on a "per N cells" basis $$\frac{\Delta Q_{cool}}{\Delta t} \cong \{\dot{m} C_p \Delta T\} \text{ form} \Big| \text{Note that } [\Delta Q_{cool} = N_{cell} \Delta Q_{cell}] \quad (8)$$

In the following two expressions, the first applies if $C_p$ is f(T); otherwise, the second expression holds.

$$\left[\begin{array}{l} \frac{\Delta Q_{cool}}{\Delta t} = \left(\dot{m}_{Batt_{cool}} + \frac{M_{Batt_{cool}}}{\Delta t}\right)(C_p(T_\infty)T_\infty - C_p(T_\infty^o)T_\infty^o) \\ \frac{\Delta Q_{cool}}{\Delta t} = \left(\dot{m} + \frac{M}{\Delta t}\right)C_p(T_\infty - T_\infty^o) \end{array}\right]$$

Unknowns are $(\Delta Q_{cell}, T_\infty)$. $T_\infty^o$ is initial or inlet coolant T with respect to Batt.

Since $C_p$ for liquids beneath their boiling points is generally reasonably constant, then the simpler form of Eq. (8) shown above is justified. However, the source heat term is firmly dependent on T. Thus, the above equations may be summarized as $$\frac{\Delta T}{\Delta t} = \frac{(T - T_0)}{\Delta t} \cong \left(\frac{1}{\rho V c_p}\right)_{Batt} [hA(T_\infty - T) + \dot{q}_{source}(T)V] \quad (9)$$

$$\left[\frac{\Delta Q_{cell}}{\Delta t} \cong hA(T_\infty - T) + \dot{q}_{source}(T)V\right] \quad (10)$$

$$\frac{N_{cell}\Delta Q_{cell}}{\Delta t} \cong \left(\dot{m} + \frac{M}{\Delta t}\right)_{Batt_{cool}} C_{p_{cool}} (T_\infty - T_\infty^o) \quad (11)$$

$$\downarrow$$

or other representation

Since $\dot{q}_{source}(T)$ depends on average or representative T over $\Delta t$, then solving these equations for the unknowns (T, $T_\infty$, $\Delta Q_{cell}$) may require an iterative method while checking the Biot (Bi) number to verify applicability of the lumped-parameter model (LPM) for heat transfer.

$$Bi \equiv \frac{hV/A}{k};$$

$Bi \leq 0.2$ for LPM to be valid.

One such iterative method involves the following elements:
1. Estimate T ($T_{guess}$)
2. Determine $\dot{q}_{source}(T)$—(from battery data as f(T) or Ohmic heating expression)
3. Solve set of equations for (T, $T_\infty$, $\Delta Q_{cell}$)
4. Check value of $T_{solved}$ vs $T_{guess}$
5. Update $T_{guess}$ and repeat steps 2-4 until determined agreement is seen between $T_{solved}$ and $T_{guess}$.

Aspects of the invention provide various advantages, which in some embodiments include an option to perform electrical preheating of vehicles. The thermal management system having the phase change material (e.g., an intelligent-based phase change material) would preheat vehicle components in accordance with preset options (e.g., regionally defined), thus eliminating the need for a user to connect (e.g., plug) or disconnect (e.g., unplug) an electrical heater before and after each use. Effective thermal management of hybrid electrical vehicles (HEVs) increases battery efficiency by maintaining favorable electrolyte conductivity, while extending battery lifetime by avoiding excessive temperatures. Thus, replacement of the batteries may be foregone until well within the expected lifetime of the batteries. Consequently, an HEV having the thermal management system in accordance with various aspects would have greater power at low temperatures.

Additionally, comforts of a passenger cabin of the vehicle may be enhanced by using the thermal management system, in accordance with various aspects, during cold-start conditions, as the design of the thermal management system permits excess thermal energy to be directed to the cabin heater core (e.g., internal combustion engine cabin 118) as determined by control logic protocol described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a thermal management system for a vehicle, the method comprising:
   thermally coupling a first coolant loop configured to circulate a first coolant mixture to a battery module and a first heat exchanger having a thermal energy storage material disposed therein located within the first coolant loop, wherein thermally coupling the first coolant loop to the battery module and the first heat exchanger comprises:
      coupling a first side of the first coolant loop to the battery module configured to flow the first coolant mixture from the first heat exchanger to the battery module; and
      coupling a second side of the first coolant loop to the battery module configured to flow the first coolant mixture from the battery module to the first heat exchanger;
   thermally coupling a second coolant loop configured to circulate a second coolant mixture distinct from the first coolant mixture of the first coolant loop to the first heat exchanger;
   coupling a second heat exchanger configured to cool the first coolant mixture to the first side of the first coolant loop between the first heat exchanger and the battery module;
   providing an interface between the second coolant loop and an internal combustion engine of a vehicle configured to transfer heat generated by the internal combustion engine to the first heat exchanger, via the second coolant loop, for storage within the thermal energy storage material;
   providing a first bypass fluid path permitting the first coolant mixture to bypass the first heat exchanger and circulate between the second heat exchanger and the battery module in order to cool the first coolant mixture and thereby reduce a temperature $T_{Batt}$ of the battery module below a maximum desirable temperature $T_{max}$; and
   providing a second bypass fluid path permitting the first coolant mixture to bypass the second heat exchanger.

2. The method of claim 1, further comprising disposing a valve in a fluid flow path extending between the second heat exchanger and the first heat exchanger permitting the first coolant mixture to bypass the second heat exchanger.

3. The method of claim 1, further comprising disposing a valve in a fluid flow path extending between the first heat exchanger and the battery module to bypass the first heat exchanger in the first coolant loop.

4. A method of thermal management using the thermal management system produced by claim 1, the method comprising selectively transferring the heat generated by the internal combustion engine to the first heat exchanger via the second coolant loop for storage in the first heat exchanger.

5. The method of claim 4, further comprising flowing the first coolant mixture to the second heat exchanger through the first bypass fluid path.

6. The method of claim 4, further comprising selectively delivering the heat stored in the first heat exchanger to the battery module via the first coolant loop to increase the temperature $T_{Batt}$ of the battery module.

7. The method of claim 6, wherein transferring the heat generated by the internal combustion engine to the first heat exchanger via the second coolant loop for storage in the first heat exchanger comprises at least partially melting the thermal energy storage material stored within the first heat exchanger.

8. The method of claim 6, further comprising transferring heat generated by the first heat exchanger to the second coolant mixture.

9. The method of claim 6, further comprising after transferring the heat to the first heat exchanger, increasing one or more of sensible heat or latent heat of fusion of the thermal energy storage material from a first thermal state to a second, higher thermal state.

10. The method of claim 9, further comprising selectively delivering the heat generated by the internal combustion engine to heat a passenger cabin of the vehicle via the first heat exchanger and the second coolant loop.

11. The method of claim 10, further comprising selectively performing one or more of preheating the battery module, heating the passenger cabin of the vehicle, and increasing sensible heat or latent heat of fusion of the thermal energy storage material from the first thermal state to the second, higher thermal state using heat stored within the thermal energy storage material.

* * * * *